United States Patent
Steinbichler et al.

(10) Patent No.: US 7,570,370 B2
(45) Date of Patent: Aug. 4, 2009

(54) METHOD AND AN APPARATUS FOR THE DETERMINATION OF THE 3D COORDINATES OF AN OBJECT

(75) Inventors: Markus Steinbichler, Neubeuern (DE); Thomas Mayer, Kolbermoor (DE); Markus Estermann, Babensham (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 0 days.

(21) Appl. No.: 11/973,968

(22) Filed: Oct. 11, 2007

(65) Prior Publication Data

US 2008/0130016 A1 Jun. 5, 2008

(30) Foreign Application Priority Data

Oct. 11, 2006 (DE) .................. 10 2006 048 234

(51) Int. Cl.
*G01B 11/24* (2006.01)
(52) U.S. Cl. .................. 356/603; 356/604
(58) Field of Classification Search .... 356/237.1–241.6
See application file for complete search history.

(56) References Cited

U.S. PATENT DOCUMENTS

| | | | | |
|---|---|---|---|---|
| 4,957,367 A * | 9/1990 | Dulman | ............... | 356/512 |
| 5,175,601 A * | 12/1992 | Fitts | ............... | 356/604 |
| 5,377,011 A * | 12/1994 | Koch | ............... | 356/602 |
| 6,418,257 B1 * | 7/2002 | Nath | ............... | 385/125 |
| 6,438,272 B1 | 8/2002 | Huang et al. | | |
| 6,493,095 B1 * | 12/2002 | Song et al. | ............... | 356/603 |
| 6,664,531 B2 * | 12/2003 | Gartner et al. | ............... | 250/208.1 |
| 6,754,370 B1 | 6/2004 | Hall-Holt | | |
| 6,963,688 B2 * | 11/2005 | Nath | ............... | 385/125 |
| 7,009,718 B2 | 3/2006 | Fujita | | |
| 7,061,628 B2 * | 6/2006 | Franke et al. | ............... | 356/604 |

FOREIGN PATENT DOCUMENTS

DE 103 07 209 9/2004
DE 20 2004 005191 8/2005

* cited by examiner

*Primary Examiner*—L. G Lauchman
*Assistant Examiner*—Jarreas C. Underwood
(74) *Attorney, Agent, or Firm*—Dilworth & Barrese LLP

(57) ABSTRACT

A method serves for the determination of the 3D coordinates of an object (2). A fringe pattern is projected onto the object (2) in the method. The light reflected by the object (2) is recorded and evaluated. To improve such a method, the fringe pattern is projected onto the object (2) by an imaging element (only FIGURE).

20 Claims, 1 Drawing Sheet

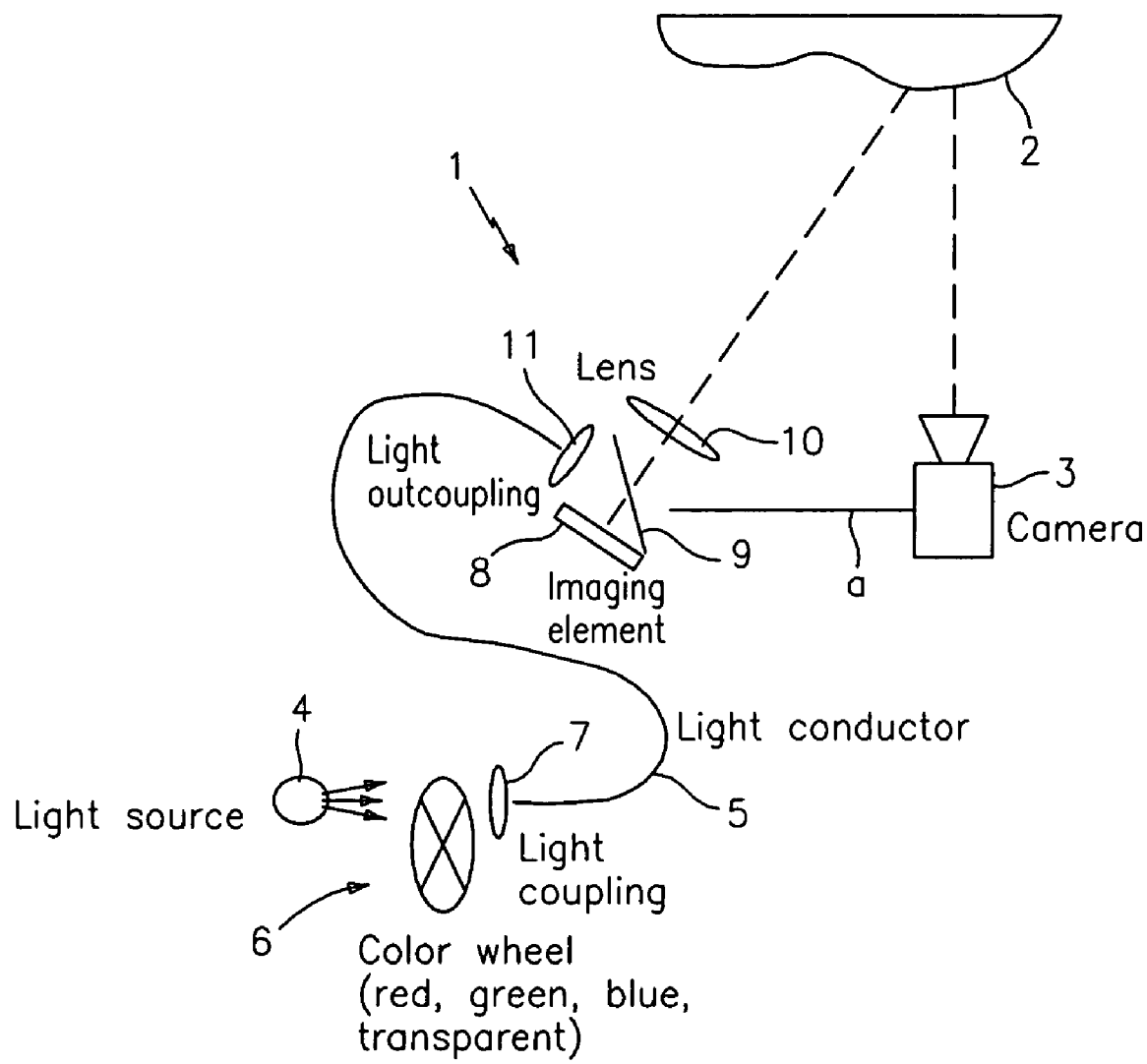

METHOD AND AN APPARATUS FOR THE DETERMINATION OF THE 3D COORDINATES OF AN OBJECT

BACKGROUND OF THE INVENTION

The invention relates to a method for the determination of the 3D coordinates of an object and to an apparatus for the carrying out of such a method.

Optical 3D measuring methods for the determination of the 3D coordinates of an object are already known. In this connection, the methods of active, pictorial triangulation are much superior to other measuring methods with respect to data quality and measuring speed. In the methods of active, pictorial triangulation, the object to be measured is illuminated using one or more fringe patterns and is observed using one or more cameras, in particular digital area scan cameras, at one or more specific angles for the projection of the fringe pattern. Fringe patterns of different direction, frequency (fringe spacing, period) and/or amplitude development can be used.

The calculation of the 3D coordinates (3D data) of the measured object usually takes place in an evaluation computer via the evaluation of the fringe images detected by the camera or cameras. In this context the gray code method, the phase shift method, the multi wavelength method or another method or a combination of these methods are used.

In known solutions, the fringe patterns or other patterns to be projected are applied to a glass slide. The modification of the pattern during the measuring procedure takes place via a rotation and/or displacement of the slide carrier in the beam path of the projector. This results in a relatively long measuring time which is caused by the necessary highly precise displacement and/or rotation of the glass slide and by the time of the image data taking and the image transfer to the evaluation computer.

SUMMARY OF THE INVENTION

It is the object of the invention to provide an improved method and an improved apparatus of the initially recited kind.

This object is solved in accordance with the invention in a method and an apparatus of the initially recited kind.

In the method in accordance with the invention for the determination of the 3D coordinates of an object, a fringe pattern is projected onto the object. The light reflected by the object is recorded and evaluated. The fringe pattern is projected onto the object by an imaging element. It is in particular an imaging element for fast pattern projection. The imaging element can be controllable. The imaging element is preferably controllable in a pixelwise manner. The use of a moving glass slide becomes superfluous by the use of an imaging element. Short measuring times can thereby be achieved.

Advantageous further developments are described herein.

The fringe pattern is preferably projected onto the object by an LCOS display (Liquid Crystal On Silicon Display), a mirror array and/or an LCD display (Liquid Crystal Display).

It is advantageous for the light of the light source for the generation of the fringe pattern to be supplied to the object via a liquid light conductor. Short measuring times are also hereby realizable. Lamps can be used in an external light source which supply the projector light to a projector via a liquid light conductor. It is hereby possible to work with very high lamp powers since the power loss of the lamp does not heat up the projector structure relevant for the system precision, which could result in thermal deformations of the structure, but only the external lamp housing not relevant for the system precision. A high lamp power makes a short measuring time possible due to short exposure times of the camera.

A further advantageous further development is characterized in that the image data taken are intermediately stored in a camera memory and subsequently forwarded for evaluation. This also serves for the further shortening of the measuring time. In particular high-speed cameras with CCD technology or CMOS technology can be used which have a camera memory in which the image data are stored, with the relatively slow data transfer to the evaluation device only being carried out after the actual detection of the image data or of the pattern sequence.

It is advantageous for the triangulation base and/or the triangulation angle to be variable. Different measuring volumes can hereby be realized. The measuring precisions can be varied instead or in addition.

In accordance with a further advantageous further development, the local reflectivity of the object is determined and the brightness of the fringe pattern is locally adapted to the reflectivity of the object. This is in particular of importance in the measurement of objects having different reflectivity. The projection of a fringe pattern locally adapted to the object reflectivity in brightness can take place here. This serves the ideal utilization of the dynamic camera range and the uninterrupted detection of the object surface.

In this context, the determination of the reflectivity of the object and the adaptation of the brightness of the fringe pattern preferably take place iteratively. The following method can be used for this purpose:

In a first step, the object brightness is determined using the camera. In a second step, a "rough" 3D measurement takes place without an adapted projection pattern. Methods suitable for this are the gray code method, the phase shift method, the multi wavelength method or another method or a combination of these methods. In a third step, a fringe projection pattern is determined using a brightness distribution adapted to the object brightness. The determination of the brightness adaptation of the projection pixels can be done from the "rough" 3D coordinate and the sensor calibration for each camera point. In a fourth step, a "precise" 3D measurement is carried out using an adapted projection pattern, that is with a projection pattern whose brightness is locally adapted to the object reflectivity. The methods (gray code, etc.) reported above for the second step are also suitable for this purpose. In a fifth, iterative step, steps three and four can be repeated. This can be done several times. The precision can be increased by the iterative procedure.

A further advantageous further development is characterized in that the determined 3D coordinates of the object are compared with the desired 3D coordinates of the object and in that the shape deviation is projected onto the object. The evaluation of the shape deviation of the measured object in relationship with the desired data of this object can take place directly after the measurement. The shape deviation can be projected onto the object to make it visible there. The shape deviation is preferably projected onto the object in a false color representation. The different colors can represent different dimensions of the shape deviation. However, other representation types are also possible, for example contour lines.

The projection of the shape deviation onto the object can take place in the following steps: In a first step, a 3D measurement of the object is carried out. In a second step, an automatic alignment and a calculation of the deviations from the desired data are carried out. The desired data can in particular be stored in a CAD desired data set. In a third step, the projection pattern is calculated and/or determined for each 3D object point. An LCOS display is preferably used for this purpose. The projection patter of the LCOS display for every 3D object point is therefore calculated and/or determined. The calculation and/or determination of the projection pattern preferably takes place for each color channel. An RGB color wheel (red/green/blue color wheel) can be used for the false color representation. On the calculation and/or determination of the projection pattern, corresponding projection pixels are calculated and/or determined for every camera pixel. In a fourth step, the RGB color wheel can be controlled. The control of the RGB color wheel takes place in synchronized fashion with the imaging element, in particular the LCOS display, for the three color channels for the projection of the shape deviation onto the measured object.

With an apparatus for the determination of the 3D coordinates of an object, the solution of the object of the invention takes place by the features of claim 10. The apparatus includes a projector for the projection of a fringe pattern onto the object, one or more cameras for the recording of the light reflected by the object and an evaluation device for the evaluation of the recorded images. The projector has an imaging element for the projection of the fringe pattern onto the object.

Further advantageous further developments are described herein.

The projector preferably has an LCOS display, a mirror display and/or an LCD display for the projection of the fringe pattern onto the object.

It is advantageous for a light source and a liquid light conductor to be present for the supply of light to the projector.

The camera can have a camera memory for the intermediate storage of the recorded image data.

It is advantageous for the triangulation base and/or the triangulation angle to be variable.

An evaluation device is preferably present for the determination of the local reflectivity of the object and for the local adaptation of the brightness of the fringe pattern to the reflectivity of the object. The determination of the reflectivity of the object and the adaptation of the brightness of the fringe pattern can take place iteratively.

A further advantageous further development is characterized by a device for the comparison of the determined 3D coordinates of the object with the desired 3D coordinates of the object and for the projection of the shape deviation onto the object. A color wheel is preferably provided for the projection of the shape deviation onto the object in a false color representation.

An embodiment of the invention will be explained in detail in the following with reference to the enclosed drawing. In the drawing the

BRIEF DESCRIPTION OF THE DRAWINGS only FIGURE shows an apparatus for the determination of the 3D coordinates of an object in a schematic representation.

DESCRIPTION OF THE PREFERRED EMBODIMENT

The apparatus for the determination of the 3D coordinates of an object 2 shown in the only FIGURE includes a projector 1 with which a fringe pattern is projected onto the object 2, a camera 3 for the recording of the light reflected by the object 2 and an evaluation unit, not shown in the drawing, for the evaluation of the recorded images. The projector 1 includes an imaging element 8, a mirror 9 and a lens 10. The imaging element 8 is in particular an LCOS display, a mirror array or an LCD display.

The light for the projector 1 originates from a light source 4 whose light is supplied to the projector 1 via a light conductor, in particular a liquid light conductor 5. The light from the light source 4 is coupled into the liquid light conductor 5 via a light coupling 7 and is cast onto the mirror 9 via a light outcoupling 11 which reflects it onto the imaging element 8 from where it is projected through the lens 10 onto the object 2. A color wheel 6 is provided between the light source 4 and the light coupling 7. It is an RGB color wheel which has four sectors, namely the sectors red, green, blue and transparent.

The camera 3 has a camera memory for the intermediate storage of the recorded image data. The image data which are intermediately stored are subsequently forwarded to the evaluation device for evaluation.

The spacing a between the projector 1 and the camera 3 forms the triangulation base. This triangulation base and the triangulation angle are variable.

The evaluation device makes possible the determination of the local reflectivity of the object 2 and the local adaptation of the brightness of the fringe pattern to the reflectivity of the object 2, with the determination of the reflectivity of the object 2 and the adaptation of the brightness of the fringe pattern taking place iteratively. Furthermore, the evaluation device includes a device for the comparison of the determined 3D coordinates of the object 2 with the desired 3D coordinates of this object and for the projection of the shape deviation to the object 2. The shape deviation can be projected onto the object 2 in a false color representation through the color wheel 6. The evaluation device can include a computer or be formed by a computer, in particular by a PC.

Short measuring times can be achieved by the invention. A sample preparation is not required. The light source 4 can be a high power light source, in particular an incandescent lamp, a discharge lamp and/or one or more high power LEDs. The high power light source 4 is located in an external housing. The projector light is supplied to the projector 1 via the liquid light conductor 5.

A projection of a fringe pattern adapted locally to the object reflectivity in brightness takes place to ensure an ideal utilization of the dynamic camera range for the uninterrupted detection of the object surface, with the calculation of the adapted projection being able to take place iteratively. The shape deviation of the measured object with respect to the desired data is determined and the shape deviation is projected directly onto the object in a false color representation, which preferably takes place directly after the measurement. For this purpose, an RGB color wheel 6 synchronized with the pattern projection, that is the projection of the fringe pattern, is used which is located in the external light source housing. The RGB color wheel can, however, also be provided in the projector housing.

In accordance with previously known solutions, objects with different reflectivity can only be incompletely measured since the pattern projection takes place with homogenous brightness over the object, but the different reflectivity of the measured object due to restricted dynamics of the camera or cameras results locally to blooming or insufficient modulation in the image, which does not allow a complete 3D data detection of the object within a measurement with a simple exposure time. This disadvantage stands in the way of a use of the previously named measuring systems for quality assurance in the production since here short measuring times are required and objects of different reflectivity have to be measured without sample preparation. In accordance with a further development of the invention, the local reflectivity of the object is determined and the brightness of the fringe pattern is locally adapted to the reflectivity of the object, whereby the described advantages can be avoided.

The invention claimed is:

1. A method for the determination of the 3D coordinates of an object (2), comprising the steps of:
   (I) controllably projecting a fringe pattern onto the object (2) by an imaging element in a pixel-by-pixel manner,
   (II) iteratively determining the local reflectivity of the object;
   (III) iteratively adapting the brightness of the fringe pattern of the object; and
   (IV) recording and evaluating the light reflected by the object (2),
   wherein said step (II) of iteratively determining the local reflectivity of the object; and said step (III) of iteratively adapting the brightness of the fringe pattern are performed by:
     (a) taking a course 3D measurement of the object without an adapted projection pattern;
     (b) determining a fringe projection pattern using a brightness distribution adapted to the determined object brightness;
     (c) performing a precise 3D measurement of the object using an adapted projection pattern whose brightness is locally adapted to the object reflectivity; and
     (d) repeating steps (b) and (c) to increase the precision of the 3D measurement.

2. A method in accordance with claim 1, wherein the fringe pattern is projected onto the object by an LCOS display, a mirror array or an LCD display.

3. A method in accordance with claim 1, wherein the light of the light source (4) for the generation of the fringe pattern is supplied to the object (2) via a liquid light conductor (5).

4. A method in accordance with claim 1, wherein the recorded image data are intermediately stored in a camera memory and are subsequently forwarded for evaluation.

5. A method in accordance with claim 1, wherein a triangulation base and/or the triangulation angle are variable.

6. A method in accordance with claim 1, wherein the determination of the reflectivity of the object (2) and the adaptation of the brightness of the fringe pattern take place iteratively.

7. A method in accordance with claim 1, further comprising the steps of:
   comparing the determined 3D coordinates of the object (2) with the desired 3D coordinates of the lens; and
   projecting the shape deviation onto the object (2).

8. A method in accordance with claim 7, wherein the shape deviation is projected onto the object in a false color representation.

9. An apparatus for the determination of the 3D coordinates of an object (2) having a projector (1) for the projection of a fringe pattern onto the object (2), one or more cameras (3) for the recording of the light reflected by the object and an evaluation device for the evaluation of the recorded images, wherein the projector (1) includes:
   an imaging element for the controllable projection of the fringe pattern onto the object (2) in a pixel-by-pixel manner,
   means for iteratively determining the local reflectivity of the object;
   means for iteratively adapting the brightness of the fringe pattern to determine a local reflectivity of the object; and
   means for recording and evaluating the light reflected by the object (2),
   wherein said means for iteratively determining the local reflectivity of the object; and said means for iteratively adapting the brightness of the fringe pattern to determine local reflectivity of the object are performed by:
     (a) taking a course 3D measurement of the object without an adapted projection pattern;
     (b) determining a fringe projection pattern using a brightness distribution adapted to the determined object brightness;
     (c) performing a precise 3D measurement of the object using an adapted projection pattern whose brightness is locally adapted to the object reflectivity; and
     (d) repeating steps (b) and (c) to increase the precision of the 3D measurement.

10. An apparatus in accordance with claim 9, wherein the projector (1) has an LCOS display, a mirror array and/or an LCD display for the projection of the fringe pattern onto the object (2).

11. An apparatus in accordance with claim 9, additionally comprising a light source (4) and a liquid light conductor (5) for the supply of the light to the projector (1).

12. An apparatus in accordance with claim 9, wherein the camera (3) has a camera memory for the intermediate storage of the recorded image data.

13. An apparatus in accordance with claim 9, wherein a triangulation base and/or the triangulation angle are variable.

14. An apparatus in accordance with claim 9, wherein the determination of the reflectivity of the object and the adaptation of the brightness of the fringe pattern take place iteratively.

15. An apparatus in accordance with claim 9, additionally comprising a device for the comparison of the determined 3D coordinates of the object (2) with the desired 3D coordinates of the object and for the projection of the shape deviation onto the object (2).

16. An apparatus in accordance with claim 9, additionally comprising a color wheel (6) for the projection of the shape deviation onto the object (2) in a false color representation.

17. An apparatus in accordance with claim 10, additionally comprising a light source (4) and a liquid light conductor (5) for the supply of the light to the projector (1).

18. An apparatus in accordance with claim 17, wherein the camera (3) has a camera memory for the intermediate storage of the recorded image data.

19. A method according to claim 7, wherein the step of projecting the shape deviation onto the object (2) further comprises:
   determining the 3D measurement of an object;
   performing an automatic alignment and calculation of deviations from desired 3D measurements of the object;
   calculating or determining a projection pattern for each 3D object point; and
   calculating or determining corresponding projection pixels for each camera pixel.

20. A method in accordance with claim 7, wherein the step of calculating or determining a projection pattern for each 3D object point is performed for each channel of an RGB color wheel.

* * * * *